No. 776,501. PATENTED DEC. 6, 1904.
T. C. DILL.
SLOTTING MACHINE.
APPLICATION FILED APR. 22, 1902.
NO MODEL. 6 SHEETS—SHEET 1.

Witnesses:-
Chas. W. Coe.
Herman E. Metins.

Inventor
Thomas C. Dill,
by his Attorneys
Howson & Howson

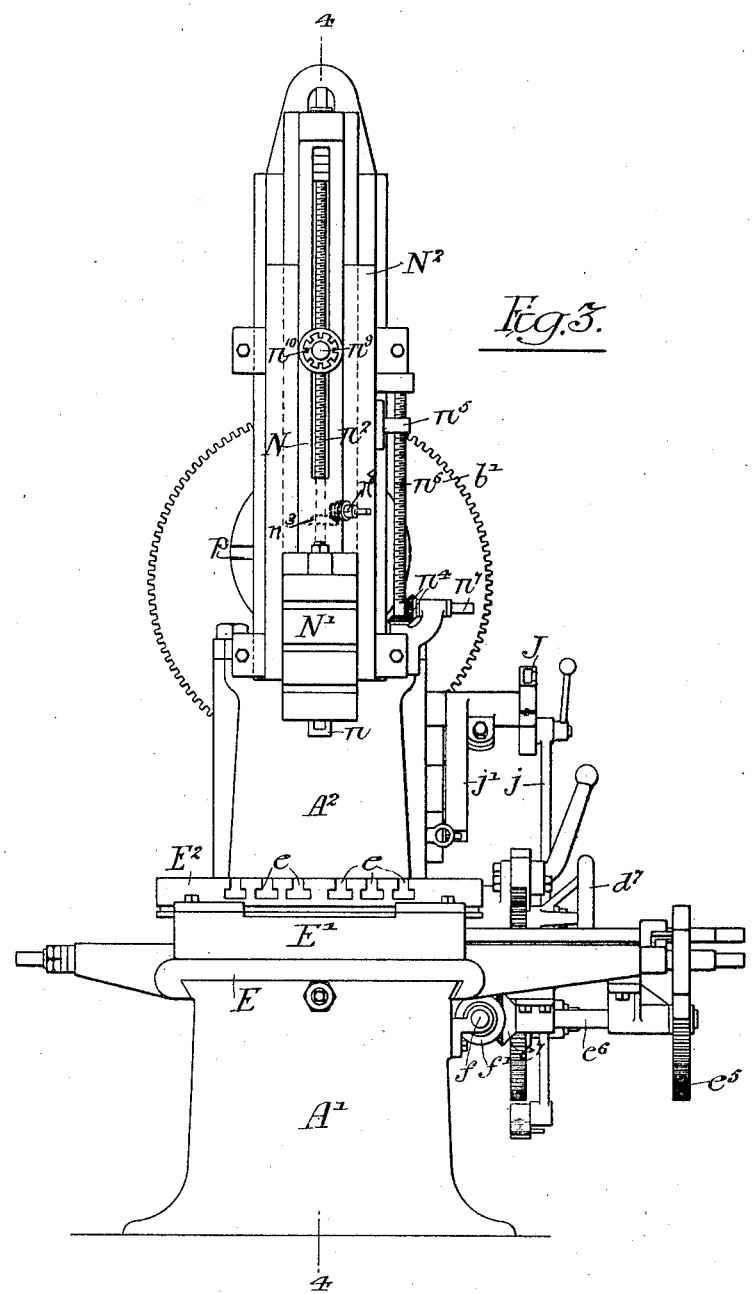

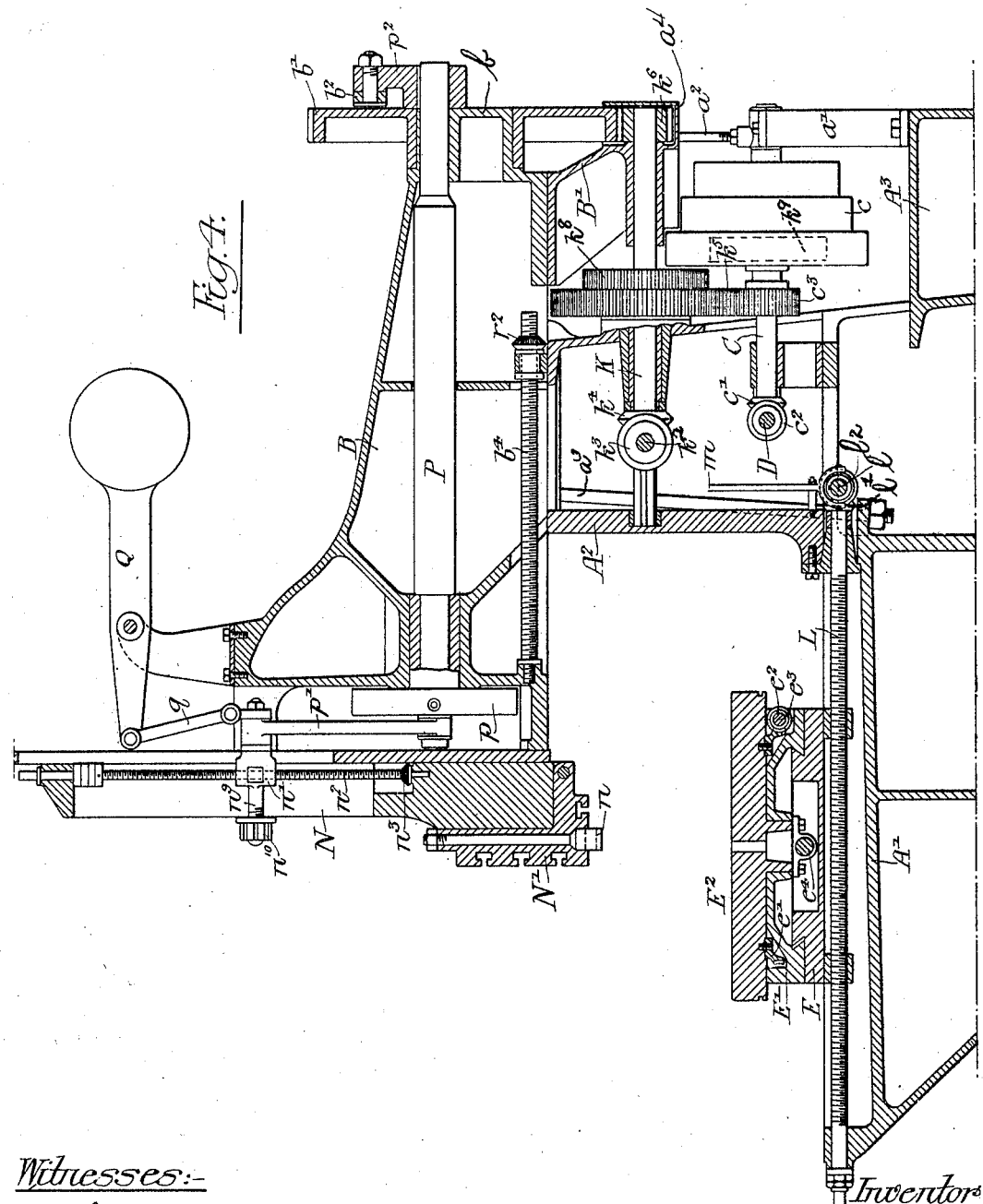

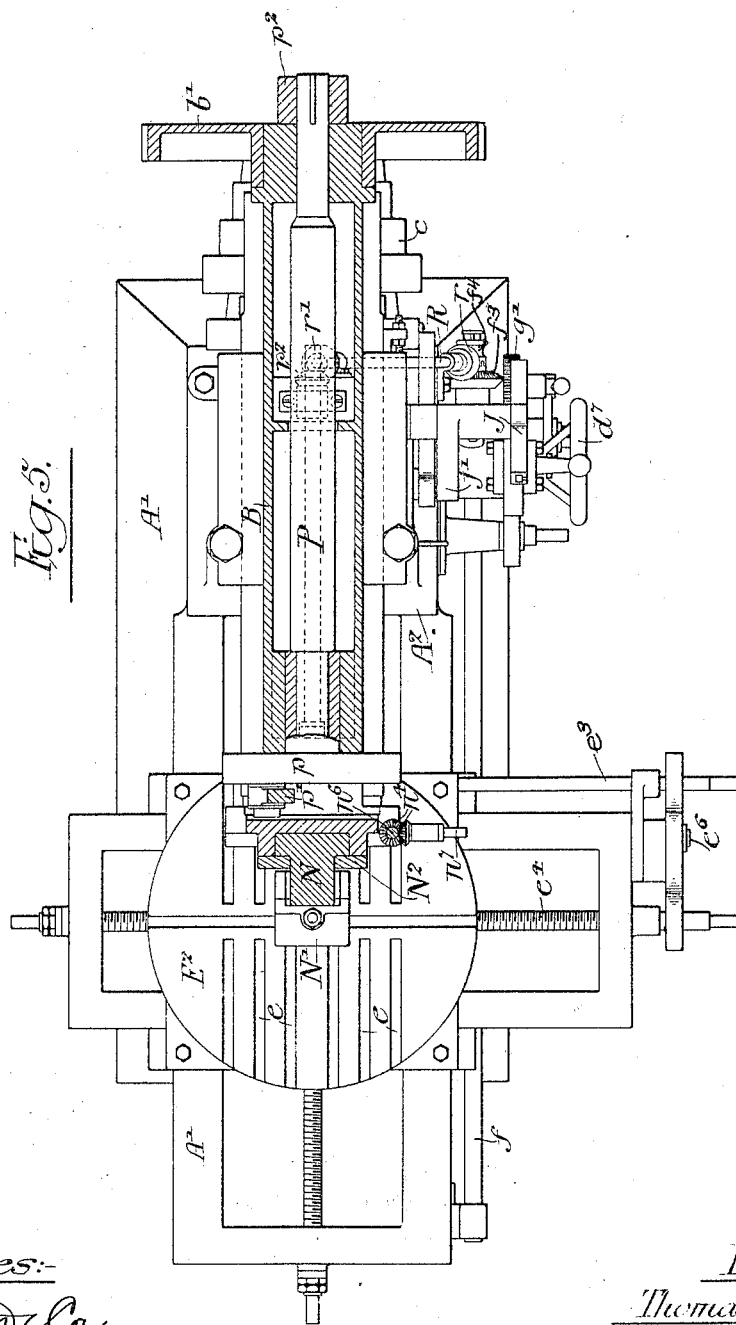

No. 776,501. PATENTED DEC. 6, 1904.
T. C. DILL.
SLOTTING MACHINE.
APPLICATION FILED APR. 22, 1902.
NO MODEL. 6 SHEETS—SHEET 6.
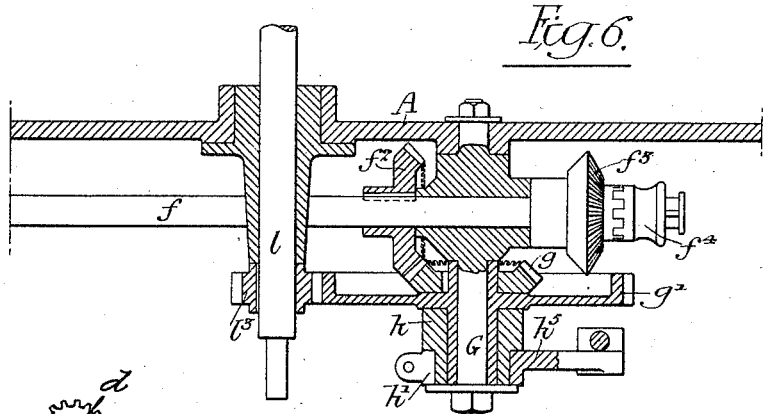
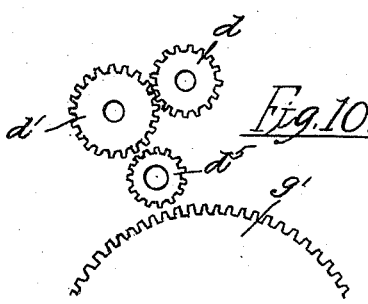
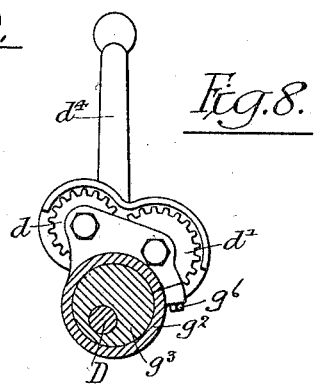
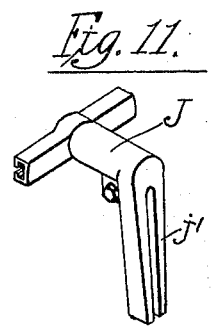
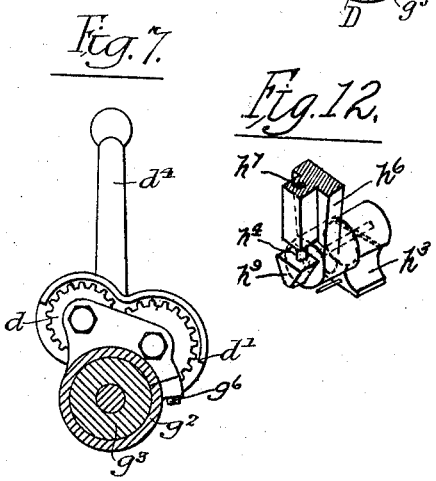
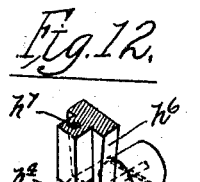
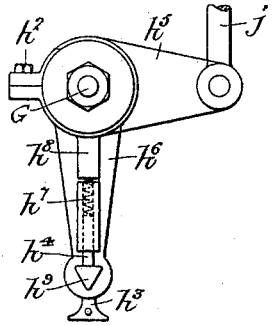
Witnesses:-
Inventor:-
Thomas C. Dill,
by his Attorneys No. 776,501. Patented December 6, 1904.

UNITED STATES PATENT OFFICE.

THOMAS C. DILL, OF PHILADELPHIA, PENNSYLVANIA, ASSIGNOR TO T. C. DILL MACHINE COMPANY, INCORPORATED, OF PHILADELPHIA, PENNSYLVANIA, A CORPORATION OF PENNSYLVANIA.

SLOTTING-MACHINE.

SPECIFICATION forming part of Letters Patent No. 776,501, dated December 6, 1904.

Application filed April 22, 1902. Serial No. 104,097. (No model.)

*To all whom it may concern:*

Be it known that I, THOMAS C. DILL, a citizen of the United States, residing in Philadelphia, Pennsylvania, have invented certain Improvements in Slotting-Machines, of which the following is a specification.

My invention relates to certain improvements in machine-tools, and more particularly to an improved form of slotting-machine having for its object the provision of a tool of the character described which may be utilized on work of widely-different sizes and which shall be substantial in construction and reliable in action.

A further object of the invention is to so construct the various parts of the machine that the adjustments of the several members thereof may be made by an operator with the greatest convenience, the device in addition being provided with mechanism which will operate to prevent damage to the machine and which shall automatically disconnect the driving mechanism of a number of the members in case the feeding mechanism on any one of them is allowed to continue in operation too long or in case any obstruction occurs to the movement of the work-carrying tables or head.

These objects, with certain other improvements in construction set forth in detail hereinafter, I secure as follows, reference being had to the accompanying drawings, in which—

Figure 1:
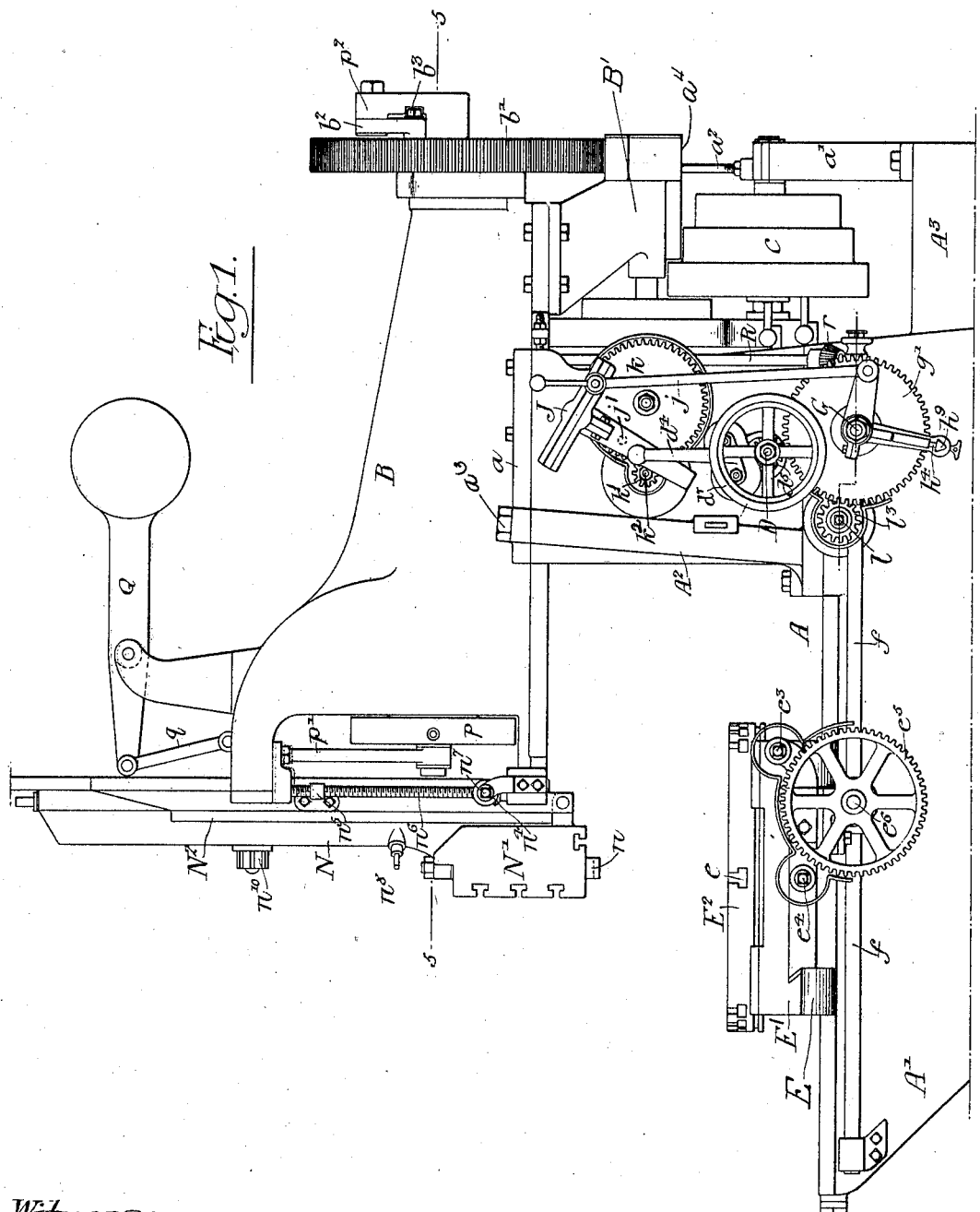
Figure 2:
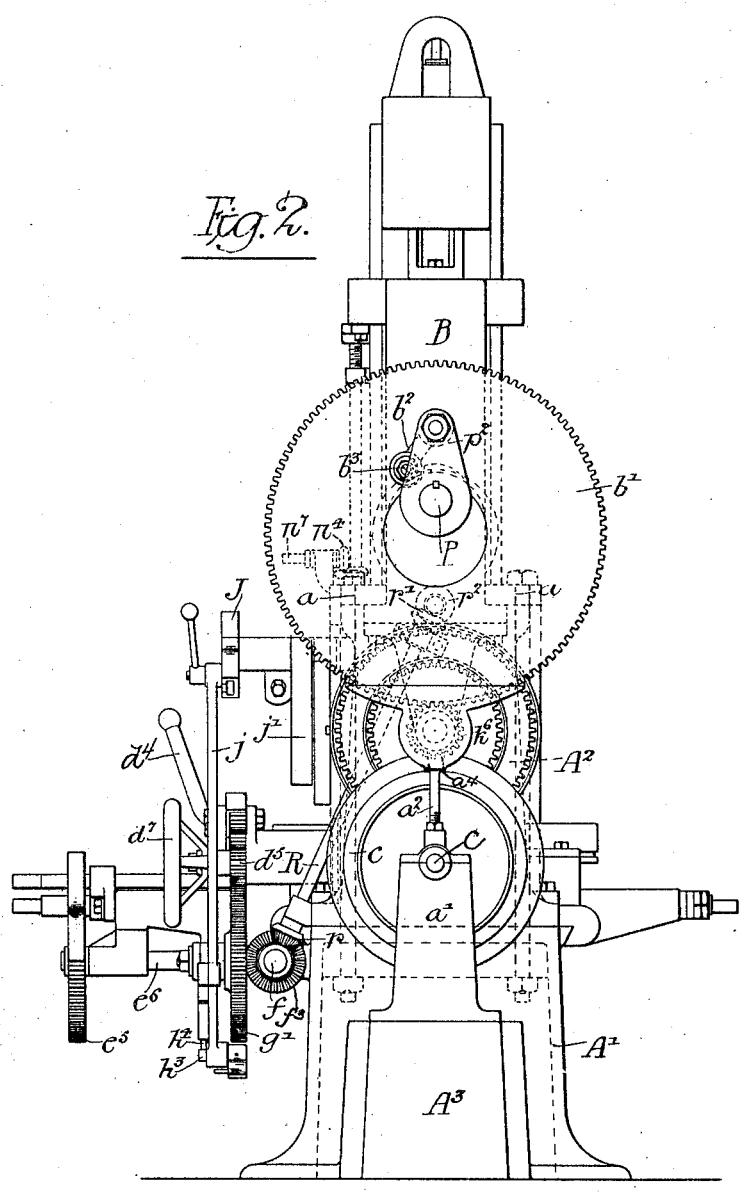

Figure 1 is an elevation of my improved machine. Fig. 2 is an elevation of the machine, taken from the rear end thereof. Fig. 3 is an elevation of the machine, taken from its front end. Fig. 4 is a sectional elevation taken on the line 4 4, Fig. 3. Fig. 5 is a sectional plan view taken on the line 5 5, Fig. 1. Fig. 6 is a sectional plan view illustrating a portion of the mechanism connecting the driving-shaft with the work-table and with the movable frame. Fig. 7 is an elevation showing the detail construction of the device for quickly traversing certain of the movable members of my machine. Fig. 8 is a slightly-modified form of the quick-traversing gear, shown in Fig. 7. Fig. 9 is a front elevation of a portion of the intermittent feed mechanism, showing the detail construction of its automatic releasing mechanism. Fig. 10 is a front elevation showing the relative positions of certain portions of the gearing employed in my improved machine. Fig. 11 is a perspective view of one of the levers employed in connection with a portion of the feeding mechanism, and Fig. 12 is a perspective view showing the detail construction of the pawl used in connection with one of the ratchet-feeds attached to my improved slotter.

In the above drawings, A is the main frame of the machine, having a substantially horizontal portion A', on which are supported the work-supporting tables described hereinafter, there being also an upwardly-projecting or standard-like portion $A^2$, upon which is carried a movable frame B, the said portion $A^2$ being provided with suitable guides $a$ on its upper portion, whereby said frame is retained in position. There is also a rearwardly-projecting part $A^3$ from the main frame A, to which is fixed the standard $a'$, this having at its top a bearing for the main driving-shaft C, on which is a cone-pulley $c$, the other end of the said shaft being provided with a suitable bearing in the body of the framework, as shown in Fig. 4. A strut $a^2$, formed in the present instance of a stout bolt or bar, extends between the standard $a'$ and the under surface $a^4$ of a depending portion B', attached to the rear of the movable frame B, this surface of the said piece sliding freely on the plane upper end of the bar forming said strut. The portion A' of the frame is provided with a faced surface upon which slides the main table E, which is thus capable of moving in the same direction as the sliding head B. A transversely-movable table E' is mounted upon suitable ways on this main table and in its turn supports a rotary table $E^2$ in the manner well known in the art. The said rotary table is provided with slots $e$ in its upper surface for the accommodation of clamps for holding in position the object operated upon and has bolted to its under face a circular rack $e'$, with which meshes a wormwheel $e^2$, carried on a shaft $e^3$, provided with bearings in the transverse table E'. A second shaft $e^4$ has bearings in the main table E and engages a threaded nut fixed to the transverse table E'. The ends of both of the shafts $e^3$ and $e^4$ are squared, so that either of them may receive a pinion or a hand-crank, and there is a relatively large gear-wheel $e^5$, carried on a shaft $e^6$, placed so as to gear with such a pinion. The shaft $e^6$ is driven from the longitudinal shaft $f$ through the medium of a pair of beveled pinions $f'$ and $e^7$, (shown in Fig. 3,) the former of these pinions being constructed so that it is compelled to turn with but slides on this shaft.

As illustrated in Fig. 6, it will be seen that the rear end of the shaft $f$ is carried in a bearing formed in a bracket G and has keyed to it a beveled pinion $f^2$, also supporting loosely a second beveled pinion $f^3$, which is attachable to it at will through the medium of a clutch $f^4$, splined to the end of said shaft.

From Fig. 6 it will be seen that the bracket G carries a bevel-pinion $g$, which meshes with the pinion $f^2$, in addition to which there is a gear-wheel $g'$, fixed to the said pinion $g$, said gear-wheel being driven from a shaft D, connected to the main driving-shaft C by two beveled pinions $c'$ and $c^2$, through the medium of either one or both of two pinions $d$ and $d'$, according to the direction in which it is desired said gear-wheel $g'$ shall be revolved. In Figs. 7 and 8 it will be seen that these two pinions are carried upon a projection from a sleeve $g^2$, revolubly carried on a stud $g^3$, through which the shaft D passes. The said shaft may be arranged either concentrically or eccentrically relatively to the stud $g^3$, according as to whether or not it is desired that the pinions $d'$ shall remain permanently in mesh with the gear-wheel $g'$. The said pinions mesh with one another, and there is an operating-arm $d^4$ attached to the said sleeve, by which it may be turned on the stud to bring either the pinion $d'$ into mesh simultaneously with the gear-wheel $g'$ and the pinion $d^5$ or to bring the pinion $d'$ into mesh with the pinion $d^5$ at the same time that the pinion $d$ meshes with the gear-wheel $g'$, it being understood that the said pinion $d^5$ is keyed to the shaft D. The sleeve $g^2$ is slit and provided with bolts $g^6$, whereby its friction with the stud $g^3$ may be varied. A hand-wheel $d^7$ is fixed to the end of the shaft D, which is particularly adapted for stopping the motion of the various parts after the driving power has ceased its operation, it being also useful in moving said parts for purposes of adjustment, &c.

Loosely carried upon a portion of the hub of the gear-wheel $g'$ are a pair of sleeves $h$ and $h'$, the latter being held in variable frictional contact with the former by means of a bolt $h^2$ in a manner similar to that employed with the sleeve $g^2$. Carried by the end of the arm $h^6$, projecting from the sleeve $h$, is a pawl $h^3$, constructed to engage the teeth of the gear-wheel $g'$, there being a spring-controlled plunger $h^4$ whereby the pawl is retained in any one of three positions. As shown in Fig. 9, the plunger $h^4$ operates in a tubular projection carried by the arm $h^6$, which is so situated that the spring $h^7$, actuating said plunger, bears upon the end of an arm $h^8$, projecting from and formed integral with the sleeve $h'$, this arm normally serving to retain the spring in position.

A prismatic piece $h^9$ is carried by the pivot for the pawl $h^3$, and the plunger $h^4$ bears upon any one of the faces of said piece, thereby retaining it, with the attached pawl, in any one of three positions. A second arm $h^5$, forming part of the sleeve $h'$, is connected to an arm of the pivoted lever J by means of a bar $j$, the end of this bar being adjustable in a slot in said lever, so that its distance from the pivotal point thereof may be varied.

Rigidly attached to the lever J and projecting from a point adjacent to the supporting-pivot thereof is a slotted arm $j'$, engaging a pin (shown in dotted lines in Fig. 1) which projects from the face of the gear-wheel $k$. This is driven in the present instance from the main shaft C through a pinion $k'$ and a shaft $k^2$, beveled pinions $k^3$ and $k^4$, a shaft K, and a gear-wheel $k^5$, meshing with a pinion $c^3$ on said driving-shaft. There is also on said driving-shaft a second pinion or gear $k^9$ (indicated in dotted lines in Fig. 4) and normally lying within the cone-pulley $c$. When desired, the pinion $c^3$ with this gear may be moved horizontally upon the shaft C, so as to bring the gear $k^9$ into mesh with a second gear $k^8$ on the shaft K, by this means making possible a wider range in the speed of the shaft K and its connected mechanism.

The table E, with its attached parts, is moved longitudinally by means of a shaft L, supported in a bearing in the portion A of the frame and passing through suitable threaded nuts fixed to said table, this shaft being driven from an auxiliary shaft $l$ through a pair of beveled pinions $l'$ and $l^2$, there being a pinion $l^3$ on the outer end of said shaft, which meshes with the gear-wheel $g'$. The pinion $l^2$ is splined to the shaft $l$, and there is a pivoted lever $m$ engaging a portion of said shaft projecting through a suitable opening in the side of the portion $A^2$ of the frame, whereby said pinion may be moved into and out of gear with the pinion $l'$.

As shown, there is a relatively large bolt $a^3$ extending at an angle downwardly from the guide-pieces $a$ for the movable frame to suitable lugs projecting inwardly from the lower portion of the main frame. The nuts on these bolts are set up so that the said bolts are continually in a state of tension, thereby serving to stiffen the structure upon which the movable frame rests and reducing to a minimum the elasticity or springiness hitherto so objectionable when a heavy cut was made by the tool.

The movable frame B of my improved machine has at its forward end a vertically-reciprocable tool-carriage N sliding in suitable ways $N^2$, which are, however, mounted to slide vertically on the frame B and are provided with a threaded nut $n^5$ and an adjusting-screw $n^6$, by which they are movably supported upon the said movable frame, said screw being connected by means of beveled gears $n^4$ to a square-ended shaft $n^7$, by which the position of the guides or ways $N^2$ may be adjusted.

The tool-carriage N is provided with a portion N' having slots for clamps to hold a tool either on its front or bottom face, and also has a slotted tool-post $n$ for use if it should be desired to employ the machine as a shaper. A cross-head $n'$ has passing through it a vertical screw $n^2$, held in bearings in the tool-carriage, and has pivoted to it the connecting-rod $p'$, which is operated from the shaft P through a crank $p$. A forwardly-projecting part $n^9$ of this cross-head is threaded, passing through a vertical slot in the tool-carriage N, and has a small hand-wheel or nut $n^{10}$, by which it may be clamped in any desired position after it has been adjusted on said carriage. The screw $n^2$ is operated to adjust the position of the cross-head relatively to the tool-carriage N by means of a small shaft $n^8$, which passes through the framework of the carriage and projects from one side thereof, it being provided with a squared end for the accommodation of a suitable handle and being connected to the screw $n^2$ through beveled gear-wheels, one of which is shown at $n^3$, Fig. 4, the position of the other being indicated by dotted lines in Fig. 3.

By means of the above-described arrangement of parts it is possible whenever the tool-carriage is adjusted to make a cut at any particular point on a piece of work to move the guides or ways upon which it slides into the most advantageous position for the operation of the carriage.

A weighted lever Q, pivoted to the movable frame B, is connected to the cross-head $n'$ through a link $q$, serving to assist the operation of the shaft on the upstroke of the tool-carriage. From Fig. 4 it will be noted that the rear bearing of the shaft P is provided in a portion $b$ of the frame which is cylindrical in form and which carries upon it eccentrically to said shaft a relatively large gear-wheel $b'$. A crank $p^2$, keyed to the shaft P, and a link $b^2$, pivoted to a pin $b^3$ on the gear-wheel $b'$, serve to operatively connect this latter with the shaft P, the said gear-wheel $b'$ being driven from the main shaft C through the pinion $c^3$, gear-wheel $k^5$, shaft K, and a pinion $k^6$. The object of the peculiar connections between the gear-wheel $b'$ and the shaft P is to cause the said shaft, and hence the crank $p$, attached thereto, to have a varying angular velocity at different points of its revolution, and thereby to correspondingly cause the speed of the tool-carriage to be different at different points of its stroke. From Figs. 2, 4, and 5 it will be seen that when the connecting-rod $p'$ is at the quarter, or ninety degrees removed from the top portion of its stroke, the crank $p^2$ is substantially perpendicular, projecting upward from the shaft P, and under operating conditions such relative arrangement of parts results in the tool-carrying head being moved with a maximum velocity just preceding, during, and immediately after its passage through the lower end of its stroke. Instead of the tool being slowed down as it nears the end of its cutting stroke, as has heretofore been the case, its speed is maintained and even accelerated at this point, so that not only the machine as a whole, but the tool as well, is utilized to the best possible advantage. The good results arising from such an arrangement of parts are particularly noticeable when tools capable of operating at high cutting speeds are employed, since under the conditions above noted tools are used at their highest efficiency during the greater portion of the working stroke of the tool-head.

Both the gear-wheel $k^5$ and the pinion $k^4$ are splined to the shaft K, which is therefore free to move longitudinally through them, while necessarily turning or operating them through the medium of a key, such construction allowing the movable frame B, with all of its attached parts, to be moved upon the vertical portion or standard $A^2$ of the main frame A, while still maintaining its operating mechanism in connection with the source of power.

A screw $b^4$ is fixed to the movable frame B and passes through a threaded nut on the part $A^2$ of the frame A, being operated from the beveled pinion $f^3$ on the shaft $f$ through the medium of an inclined shaft R, there being also suitable beveled pinions $r$ and $r'$ on said shaft R and a similar pinion $r^2$ on the screw $b^4$.

In use it will be seen that when an object of relatively large diameter, such as a wheel, is to be finished on its periphery the movable frame B can be moved back while the main table E is moved forward, so that comparatively heavy cuts can be taken with the tool, there being no long unsupported portion of said frame B, either front or rear, since the strut $a^2$ practically increases the length of the portion $A^2$ of the frame and takes the strain, transmitting to the part $A^3$ the downward pressure of the rear end of the movable frame B, caused by the operation of the tool. By moving the frame outward on its slides on the frame $A^2$ the various parts may be so operated as to cut, for example, a keyway in the hub of a wheel, an operation which would commonly require a separate machine from the one which had been employed in turning the periphery of the wheel. It will be seen that the movable frame B may, if desired, be intermittently fed outward by throwing the clutch $f^4$ into engagement and turning the pawl $h^3$ so that it catches the teeth on the wheel $g'$. With such a connection of the various parts the intermittent revolution of the gear-wheel $g'$ operates the pinions $g$, $f^2$, $f^3$, and $r$, turning the shaft R and the screw $b^4$, with consequent motion of the movable frame B. Should it be desired to quickly move this frame either to the front or rear, the clutch $f^4$ is allowed to remain so as to connect the shafts $f$ and R, the pawl $h^3$ being moved so as to remain out of engagement with the gear $g'$, and the handle $d^4$ is turned on its pivot, thus bringing either of the gear-wheels $d$ or $d'$ into contact with the gear-wheel $g'$ and the pinion $d^5$. Since this latter is continuously rotated from the main shaft, such action immediately traverses the movable frame to the front or rear, according to the direction in which the handle $d^4$ has been turned. Similarly by throwing the clutch $f^4$ out of use and moving the lever $m$ so as to cause the pinion $l^2$ to engage the pinion $l'$ the table E may be moved to the front or rear of the machine through the screw L. It will be here noted that the pinion $l^3$ is designed for use upon any one of the three shafts $l$, $e^3$, and $e^4$, and if it be placed upon the latter of these the transverse table E' may be intermittently moved or continuously slid on its ways by means of the pawl mechanism $h^3$ or the pinions $d$, $d'$, and $d^5$, as above set forth. Again, by placing the pinion $l^3$ upon the shaft $e^3$ and throwing the handle $d^4$ so that its attached pinions mesh with the gear-wheel $g'$ the table $E^2$ may be continuously rotated. By placing the pinion $l^3$ on the proper one of the three above-mentioned shafts and an ordinary crank-handle upon the squared end of the shaft $l$ any of the various adjustable members of the machine may be moved from this single point. By providing a hand-wheel $d^7$, as shown in Fig. 1, on the outer end of the shaft D, I am enabled to very quickly bring any moving portion of the machine to rest by hand-power after the motive power has been disconnected from the cone-pulley. Further, by the use of the split sleeves $g^2$ and $h'$, as above set forth, it will be seen that in case the feeding mechanism of any member of the machine is allowed to remain in action too long, so that said member strikes some fixed part of the machine, these sleeves will slip upon their supporting members, thus preventing damage to the machine. If, for example, the operation of any of the parts driven by the action of the pawl $h^3$ upon the gear-wheel $g'$ should be obstructed by any means, the abnormal load upon the pawl would cause the sleeve $h'$ to slip upon the sleeve $h$. Such motion would at once move the tubular projection on the arm $h^6$ out of line with the arm $h^8$, taking the compression from the spring $h^7$ and permitting the plunger $h^4$ to move without restraint from the piece $h^9$. The pawl $h^3$ being no longer held in place by the action of said plunger $h^4$ on the piece $h^9$ immediately turns on its pivot and assuming the position shown in Fig. 1 automatically disconnects the driving from the driven mechanism. This mechanism is not specifically claimed in this application, but forms the subject-matter of a divisional application filed by me November 14, 1904, Serial No. 232,693. By making the guideways $N^2$ movable upon the movable frame B it is possible to follow up the adjustments of the tool-carriage, so that in any position it always has the full support of its guides.

I claim as my invention—

1. The combination in a slotting-machine, of a main frame having a vertically-projecting standard thereon, a work-table mounted so as to be capable of rotation about a vertical axis, a frame mounted on said vertical standard so as to be adjustable forwardly and rearwardly across the same, a tool-carrying head mounted so as to be vertically reciprocable on said frame, and mechanism carried by the adjustable frame for imparting such vertical reciprocation to said tool-head whereby the tool may be actuated so as to operate upon work located on any part of the work-table, with means for supporting the work-table so that it is free to move toward and from the vertical standard, and means for so moving said table, substantially as described.

2. In a slotting-machine, the combination of a main frame having a table for the support of a piece of work, an upwardly-projecting portion from said main frame, a frame movably carried on the top surface of said upwardly-extending portion and provided with means whereby its position may be adjusted, said movable frame having a part overhanging the upwardly-extended portion, a vertically-reciprocable tool-carriage supported on said adjustable frame, means for operating the same, with a standard projecting from the main frame for supporting said overhanging portion of the movable frame, substantially as described.

3. The combination in a slotting-machine, of a main frame having an upwardly-projecting portion, a horizontally-adjustable frame carried on the top surface of said portion and normally overhanging the front and rear of the same, a standard also carried by the main frame and in sliding engagement with the rear overhanging portion of the adjustable frame, a work-table carried by the main frame, and a tool-carriage supported by the adjustable frame, with means for operating said tool-carriage, substantially as described.

4. The combination in a slotting-machine, of the main frame having a projecting standard thereon, a table for the reception of work to be operated upon, a frame mounted on said standard so as to be adjustable across the same, a tool-carrying head mounted so as to be reciprocable on the frame, and means for driving said tool-head, said means being carried by the adjustable frame, substantially as described.

5. The combination in a slotting-machine, of a frame, a reciprocating head thereon, means for holding work to be operated upon, a shaft having fixed to it a crank, means for turning said crank at varying rates at different points in its circle of revolution, a second crank on said shaft with means for connecting said crank to the reciprocating head, the second crank being so placed on the shaft relatively to the first crank that said second crank is moved at its maximum velocity while passing through that portion of its circle of revolution during which the reciprocating head is finishing its cutting stroke and beginning its return stroke, substantially as described.

6. The combination in a slotting-machine of a frame, means for holding work to be operated upon, a reciprocable tool-carrying head, a shaft mounted in said frame, two cranks on said shaft at substantially right angles to each other, a connecting-rod between one of said cranks and the reciprocating head, a wheel supported eccentrically to the shaft, a pin on said wheel and a link connecting the second crank to said pin, with means for driving said wheel, substantially as described.

7. In a slotting-machine, the combination of the frame having a work-supporting table, a vertically-reciprocable head on the frame, means, including a shaft, for operating said head, said frame having a cylindrical bearing portion carrying a revoluble member provided with a pin and having means connecting it to a source of power, said shaft passing eccentrically through said cylindrical portion, and having an arm with a pivoted link in engagement with said pin whereby the arm is operatively connected with the reciprocable member, substantially as described.

8. The combination in a slotting-machine of a main frame having a projecting standard, a table for the reception of work, a frame mounted on said standard so as to be adjustable across the same, a tool-carrying head mounted so as to be reciprocable on the adjustable frame, means carried by said adjustable frame for driving said tool-head, a source of power, a train of mechanism placed to be connected at will between the said source and the adjustable frame for intermittently moving the latter at a relatively low speed, and a second train of mechanism also connecting the source of power and the frame for moving said frame at a relatively high speed, substantially as described.

9. The combination in a slotting-machine of a main frame having a standard, a table for the reception of work, a frame mounted on said standard so as to be adjustable across the same, a tool-carrying head mounted so as to be reciprocable on the adjustable frame, means carried by said adjustable frame for driving said tool-head, a source of power, a shaft carried by the main frame having means connecting it with the adjustable frame for moving the same, a pawl-and-ratchet mechanism interposable between said shaft and the source of power, and gearing also interposable between said source and the shaft for continuously moving the adjustable frame at a relatively high rate of speed, substantially as described.

10. The combination in a slotting-machine of a main frame having a projecting standard, a table for the reception of work, a frame mounted on said standard so as to be adjustable across the same, a tool-carrying head reciprocable on the adjustable frame, means carried by said frame for driving said tool-head, a source of power, a screw connected to said adjustable frame, a shaft carried by the main frame, gearing connecting said shaft and the screw, pawl-and-ratchet mechanism interposable between said shaft and the source of power, and gearing independent of said mechanism, also interposable between the source of power and said shaft for driving the latter at a relatively high rate of speed in either direction, substantially as described.

In testimony whereof I have signed my name to this specification in the presence of two subscribing witnesses.

THOMAS C. DILL.

Witnesses:
WILLIAM E. BRADLEY,
JOS. H. KLEIN.